(12) United States Patent
Mhaskar et al.

(10) Patent No.: US 7,327,587 B2
(45) Date of Patent: Feb. 5, 2008

(54) SYSTEM AND METHOD FOR POWER CONVERSION

(75) Inventors: Uday Prakashrao Mhaskar, Bangalore (IN); Herman Lucas Norbert Wiegman, Niskayuna, NY (US); Amit Raja Sanglikar, Bangalore (IN); Bansidhar Jagannath Phansalkar, Bangalore (IN); Kamron Mark Wright, Fort Wayne, IN (US)

(73) Assignee: General Electric Company, Niskayuna, NY (US)

( * ) Notice: Subject to any disclaimer, the term of this patent is extended or adjusted under 35 U.S.C. 154(b) by 327 days.

(21) Appl. No.: 10/955,300

(22) Filed: Sep. 30, 2004

(65) Prior Publication Data

US 2006/0072353 A1    Apr. 6, 2006

(51) Int. Cl.
*H02M 5/458* (2006.01)
(52) U.S. Cl. ........................................ 363/37
(58) Field of Classification Search ................ 363/16, 363/17, 34, 37, 95, 97, 98, 131, 132
See application file for complete search history.

(56) References Cited

U.S. PATENT DOCUMENTS

| | | | |
|---|---|---|---|
| 3,691,438 A | 9/1972 | Farve | 318/138 |
| 4,494,051 A | 1/1985 | Bailey | 318/254 |
| 4,551,708 A | 11/1985 | Welburn | 341/116 |
| 4,642,536 A | 2/1987 | Boyd, Jr. et al. | 318/254 |
| 4,814,676 A | 3/1989 | Van Hout | 318/254 |
| 5,010,282 A | 4/1991 | Moberg | 318/254 |
| 5,017,800 A | 5/1991 | Divan | 307/66 |
| 5,220,259 A | 6/1993 | Werner et al. | 318/432 |
| 5,285,372 A * | 2/1994 | Huynh et al. | 363/132 |
| 5,537,015 A | 7/1996 | Karwath | 318/439 |
| 5,561,597 A * | 10/1996 | Limpaecher | 363/59 |
| 5,598,326 A * | 1/1997 | Liu et al. | 363/34 |
| 5,659,231 A | 8/1997 | Svarovsky et al. | 318/368 |
| 5,782,610 A | 7/1998 | Ikeda | 417/53 |
| 5,798,591 A | 8/1998 | Lillington et al. | 310/164 |
| 6,005,320 A | 12/1999 | Kim et al. | 310/156 |
| 6,008,602 A | 12/1999 | Karwath | 318/254 |
| 6,067,243 A * | 5/2000 | Suzuki et al. | 363/132 |
| 6,295,215 B1 * | 9/2001 | Faria et al. | 363/37 |
| 6,600,249 B2 | 7/2003 | Nelson et al. | 310/91 |
| 6,617,747 B1 | 9/2003 | Petersen | 310/254 |
| 6,639,371 B2 | 10/2003 | Walters et al. | 318/254 |
| 6,642,681 B2 | 11/2003 | Kawabata et al. | 318/431 |

(Continued)

*Primary Examiner*—Adolf Berhane
(74) *Attorney, Agent, or Firm*—Fletcher Yoder (57) ABSTRACT

An ac-ac power converter system is provided for supplying power to an electrical load. The ac-ac power converter system provides an output voltage having variable amplitude and/or frequency. The ac-ac power converter system includes a boost inductor for applying a discontinuous current to an ac-ac power converter. The ac-ac power converter includes a rectifier circuit comprising of a first set of gate controllable active switches for converting an input ac power to a dc power and an inverter circuit comprising of a second set of gate controllable active switches for converting the dc power to an output ac power. In addition, the ac-ac power converter system includes a switch for switching between a first mode of operation and a second mode of operation. The first set of gate controllable active switches is common between the inverter circuit and the rectifier circuit and is operable at about 50 percent of duty cycle in the first mode of operation while the inverter circuit is a half bridge inverter circuit in the second mode of operation.

30 Claims, 6 Drawing Sheets

U.S. PATENT DOCUMENTS

| | | | |
|---|---|---|---|
| 6,642,683 B1 | 11/2003 | Atmur | 318/439 |
| 6,906,933 B2 * | 6/2005 | Taimela | 363/37 |
| 2003/0034747 A1 | 2/2003 | Hsu et al. | 318/254 |
| 2003/0034748 A1 | 2/2003 | Walters et al. | 318/254 |
| 2003/0046028 A1 | 3/2003 | Mir et al. | 702/183 |
| 2003/0062860 A1 | 4/2003 | Wu et al. | 318/254 |
| 2003/0080642 A1 | 5/2003 | Mori et al. | 310/156.57 |
| 2003/0090262 A1 | 5/2003 | Ho | 324/207.12 |
| 2003/0173852 A1 | 9/2003 | Biais et al. | 310/156.43 |
| 2003/0173916 A1 | 9/2003 | Nelson et al. | 318/268 |
| 2003/0193309 A1 | 10/2003 | Sozer et al. | 318/701 |
| 2003/0201681 A1 | 10/2003 | Shimizu et al. | 310/51 |
| 2003/0201693 A1 | 10/2003 | Bales | 310/268 |

* cited by examiner

SYSTEM AND METHOD FOR POWER CONVERSION

BACKGROUND

The invention relates generally to electrical power conversion systems, and more particularly to control of electrical machines via ac-ac power converter systems.

A range of applications exists for power conversion circuitry, particularly for the control of electrical machines, such as motors. A wide variety of applications, such as air conditioners, blowers and others utilize electrical machines operating at different speeds. These different speeds may be obtained by varying amplitude and/or frequency of the voltage applied to the electrical machine. The amplitude and/or frequency of the voltage applied to the electrical machine can be varied with the help of a power processing stage introduced between the electrical machine and the supply voltage.

For example, power converter systems of various topologies may be employed to achieve speed control of electrical machines via the techniques mentioned above. However, current power converter systems generally inject harmonics into the system and into the electrical distribution grid, and also reduce the power factor of the overall system. To overcome these problems, filters and power factor correction circuits of appropriate size and type are placed at various stages of power conversion process. However, this makes the power converter system bulky and reduces the overall efficiency of the system.

It is therefore desirable to provide an efficient and robust power converter system with minimum components and simple control techniques that ensure better input power quality performance and high power factor.

BRIEF DESCRIPTION

Briefly, in accordance with one aspect of the technique, a method is provided for controlling an ac-ac power converter system. The method provides for applying a discontinuous current to an ac-ac power converter via a boost inductor and switching the ac-ac power converter between a first mode of operation and a second mode of operation. In the first mode of operation, a first set of gate controllable active switches is operated via pulse width modulation at about 50 percent duty cycle, while in the second mode of operation the first set of gate controllable active switches is operated via pulse width modulation based on at least one of a dc bus voltage requirement and a harmonic requirement at an input stage. In addition, the method provides for operating a second set of gate controllable active switches via pulse width modulation based on an output voltage requirement. Systems and computer programs that afford such functionality may be provided by the present technique.

In accordance with another aspect of the technique, a method for controlling an ac-ac power converter system provides for applying a discontinuous current to an ac-ac power converter via a boost inductor. The ac-ac power converter includes a first and a second set of gate controllable active switches. In addition, the method provides for operating the first set of gate controllable active switches via pulse width modulation at about 50 percent duty cycle and operating the second set of gate controllable active switches via pulse width modulation based on an output voltage requirement. Here again, systems and computer programs affording such functionality may be provided by the present technique.

In accordance with a further aspect of the present technique, a method is provided for controlling an ac-ac power converter system includes applying a discontinuous current to an ac-ac power converter via a boost inductor. The ac-ac power converter includes a first and a second set of gate controllable active switches. In addition, the method provides for operating a first set of gate controllable active switches via pulse width modulation based on at least one of a dc bus voltage and a harmonic requirement at an input stage and operating a second set of gate controllable active switches via pulse width modulation based on an output voltage requirement, wherein the second set of gate controllable active switches form a half bridge inverter circuit. Again, systems and computer programs providing such functionality may be provided by the present technique.

In accordance with an additional aspect of the present technique, an ac-ac power converter system is provided for supplying power to an electrical load. The ac-ac power converter system includes a boost inductor for applying a discontinuous current to an ac-ac power converter. The ac-ac power converter includes a rectifier circuit comprising of a first set of gate controllable active switches for converting an input ac power to dc power, and an inverter circuit comprising of a second set of gate controllable active switches for converting the dc power to output ac power. The ac-ac power converter system also includes a switch for switching between a first mode of operation and a second mode of operation. The first set of gate controllable active switches is common between the inverter circuit and the rectifier circuit and is operable at about 50 percent of duty cycle in the first mode of operation, while the inverter circuit is a half bridge inverter circuit in the second mode of operation.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
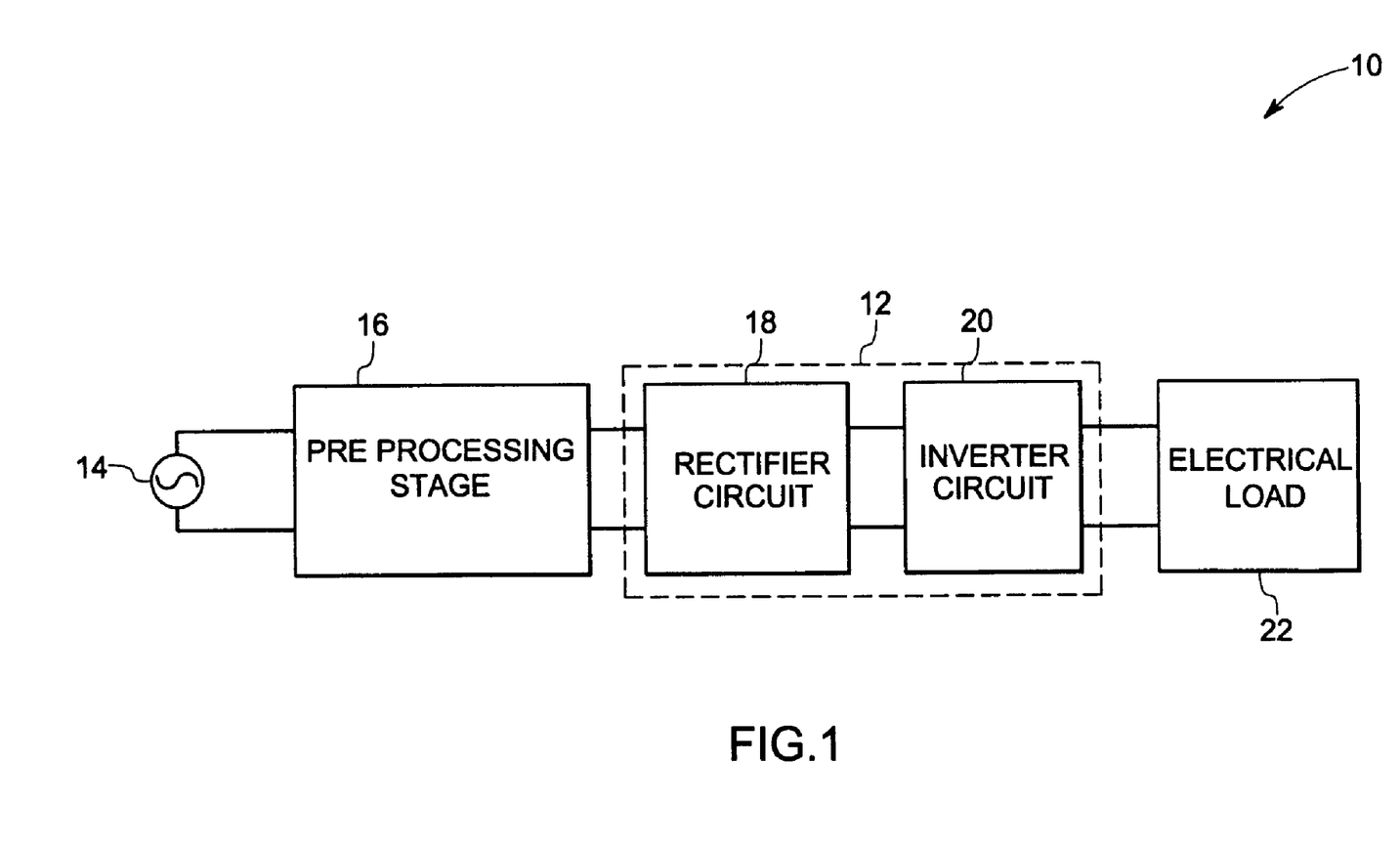
FIG. 1 depicts a block diagram of an exemplary ac-ac power converter system in accordance with one aspect of the present technique.

FIG. 1 is a block diagram of an ac-ac power converter system 10 implemented according to one aspect of the invention. The ac-ac power converter system 10 includes a power processing stage or an ac-ac power converter 12 for converting an input ac power to a desired output ac power. The ac-ac power converter 12 receives single-phase ac power from a single-phase ac power source 14, which may be ac power mains, via a pre power processing stage 16. The pre processing stage 16 prevents or reduces harmonics generated by the ac-ac power converter 12 from being injected into the ac power source 14.

The ac-ac power converter 12 further includes a rectifier circuit 18 for converting the input ac power to a dc power, and an inverter circuit 20 for converting the dc power from the rectifier circuit into the desired output ac power. The output ac power from the inverter circuit 20 is fed to an electrical load 22 coupled to the ac-ac power converter 12. In the illustrated embodiment, the electrical load may include any suitable load, such as resistive loads, single-phase ac motors, UPS systems, single-phase brushless dc motors, single-phase lighting load and any other single-phase ac loads. Additionally, an output ac filter may be introduced between the ac-ac power converter 12 and the electrical load 22 to smoothen the output ac power. Though the present discussion provides examples in a single-phase implementation, one of ordinary skill in the art will readily apprehend that the application of these techniques in a 3 phase implementations is well within the scope of the present techniques.

The ac-ac power converter system 10 as discussed above is illustrated in a greater detail in FIG. 2. The pre power processing stage 16 comprises of an ac filter 24 and a boost inductor ($L_2$) 26. The ac filter 24 is an LC filter coupled to an ac power source 14 and tuned for preventing or reducing harmonics generated by the ac-ac power converter 12 from being injected into the ac power source 14. In particular, the ac filter 24 reduces the high frequency components in the boost inductor current. In addition, the ac filter 24 improves the power factor of the overall ac-ac power converter system 10.

Figure 2:
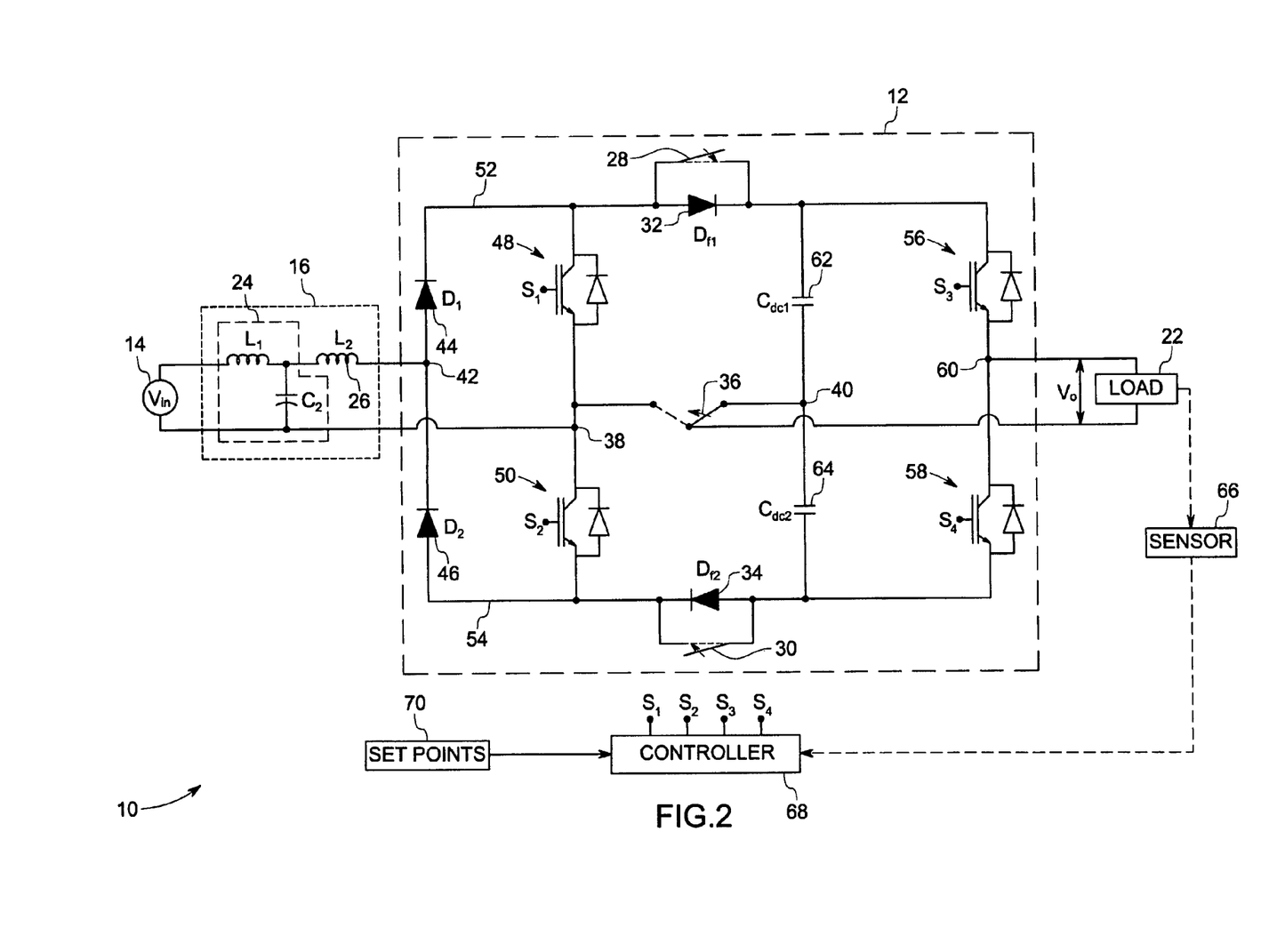
FIG. 2 is a somewhat more detailed representation of the ac-ac power converter system of FIG. 1 operable in two modes.

The ac-ac power converter 12 is operable in two modes via a plurality of switches that work in synchronization to act as a single switch. In the illustrated embodiment, two such switches 28, 30 are configured to act as shunt across dc bus diodes, $D_{f1}$ and $D_{f2}$, indicated generally by reference numerals 32 and 34, in a closed position. The third switch 36 acts as a mode selector and connects one end of the load to node 38 when the other two switches 28, 30 are in a closed position, and to node 40 when the other two switches 28, 30 are in an open position.

Figure 3:
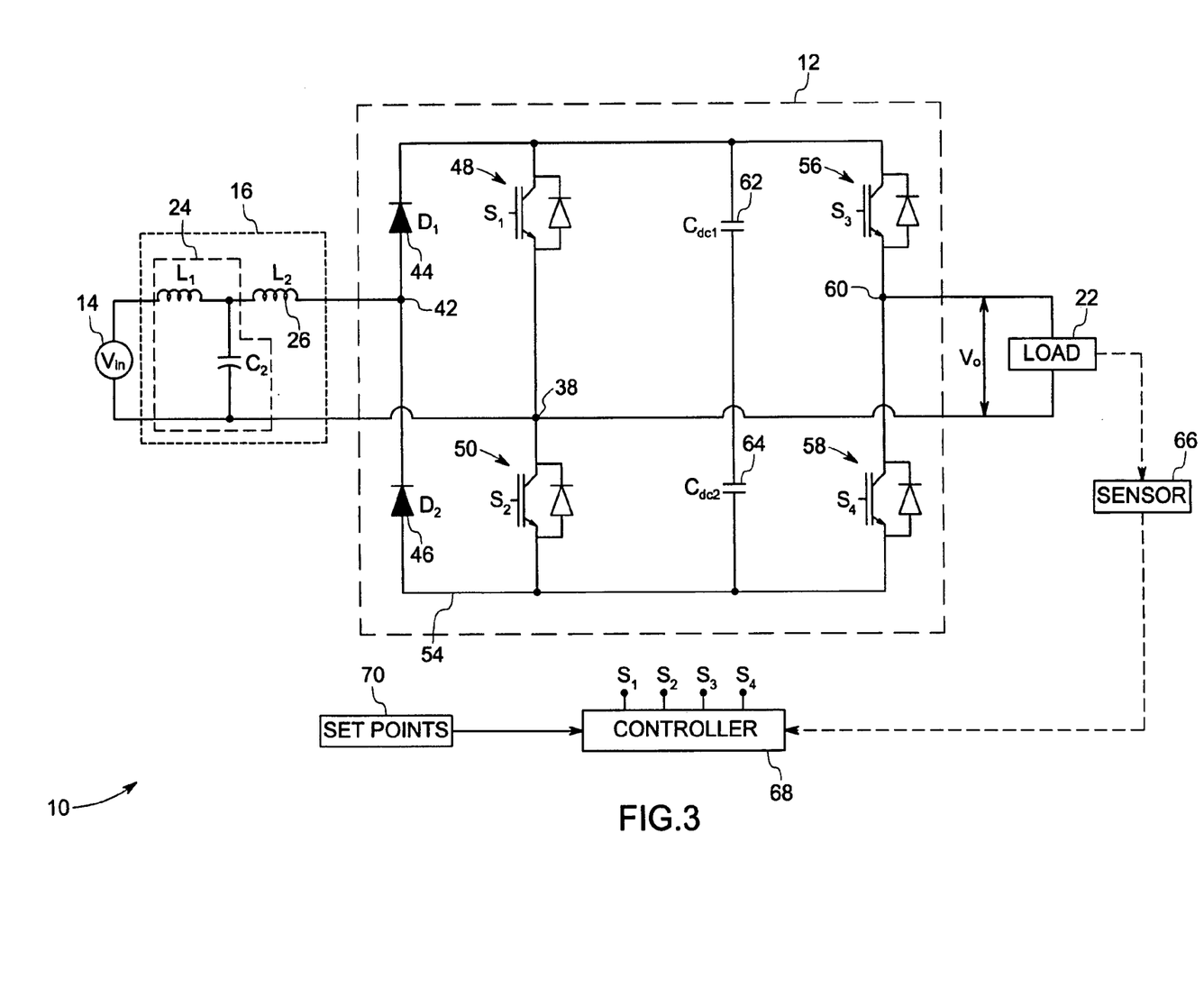
FIG. 3 depicts the ac-ac power converter system of FIG. 2 in one mode of operation.
Figure 4:
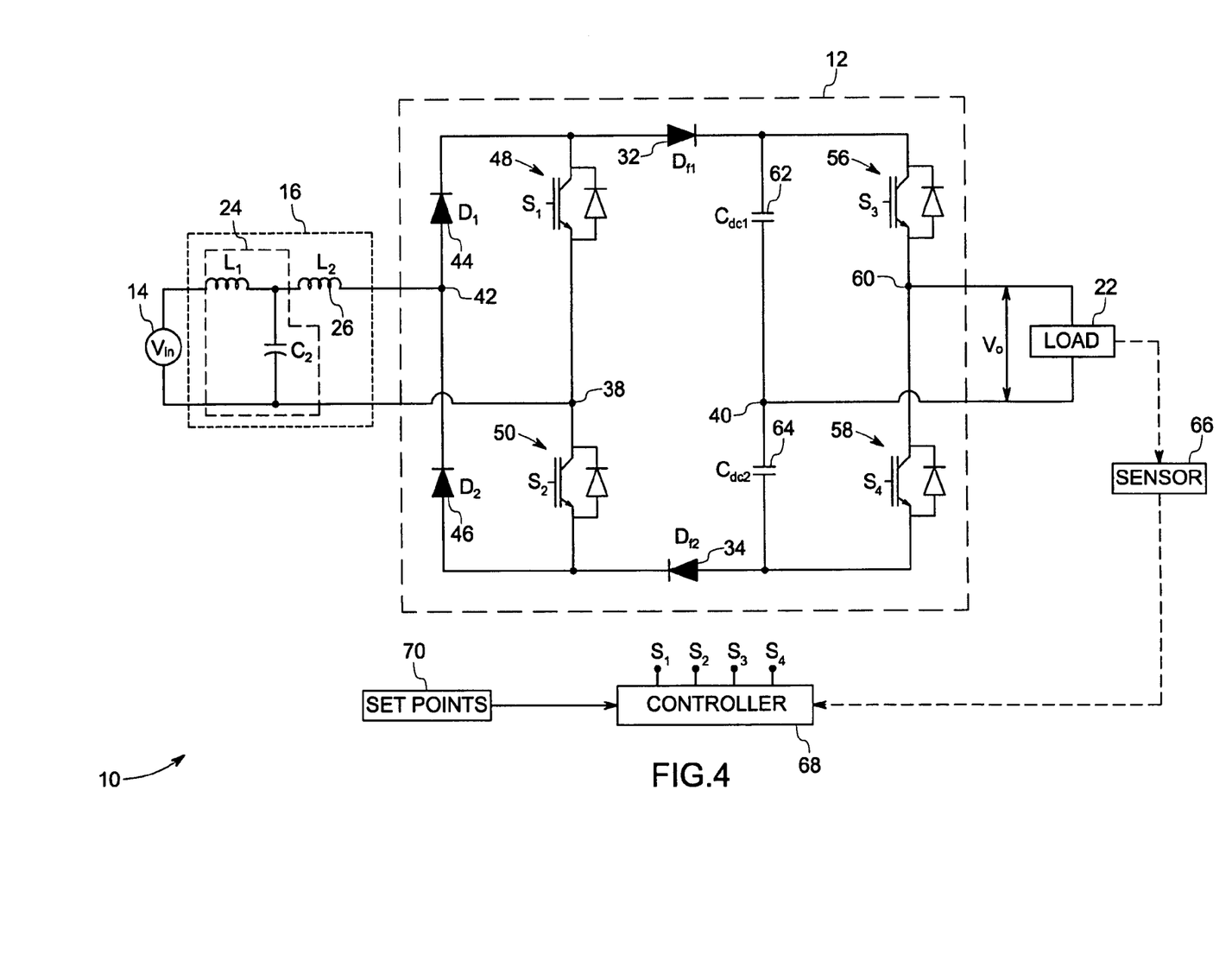
FIG. 4 depicts the ac-ac power converter system of FIG. 2 in another mode of operation.

The configuration of the ac-ac power converter 12 when the switches are closed is depicted in FIG. 3, while the configuration of the ac-ac power converter 12 when the switches are open is depicted in FIG. 4. It should be noted that for a particular application and/or desired output voltage requirement, the ac-ac power converter 12 is configured to be operated in either of the two modes and the plurality of switches may not be present. Alternatively, the choice of operating the ac-ac power converter 12 in either of the two modes lies with the user and the plurality of switches are user controllable. Further, the choice of operating the ac-ac power converter 12 in either of the two modes may be automated via a controller based on the type of application and/or output voltage requirement.

As illustrated in FIG. 3, one of the terminals of the ac power source 14 is connected to common node 38 of the ac-ac power converter 12. The other terminal is connected via the boost inductor 26 to node 42 between a pair of diodes, $D_1$ and $D_2$, indicated generally by reference numeral 44 and 46. The boost inductor 26 supplies a discontinuous current to node 42. The pair of diodes 44, 46 and a first set of gate controllable active switches, $S_1$ and $S_2$, indicated generally by reference numeral 48 and 50, is connected across dc bus lines 52 and 54, and forms a bridge rectifier circuit.

The ac-ac power converter 12 further includes the inverter circuit comprising of a second set of gate controllable active switches, $S_3$ and $S_4$, indicated generally by reference numeral 56 and 58, and the first set of gate controllable active switches 48, 50. The second set of gate controllable active switches 56, 58 is also connected across the dc bus lines 52 and 54. The first set of gate controllable active switches 48, 50 is therefore shared between the input and the output or more specifically between the rectifier circuit and the inverter circuit. Each of the first and the second set of gate controllable active switches may be a BJT, an IGBT, a thyristor or any other gate controllable active switch.

The output ac power of the inverter bridge composed of gate controllable active switches 48, 50, 56 and 58 is fed to the electrical load from connections at nodes 38 and 60. A pair of capacitors, $C_{dc1}$ and $C_{dc2}$, indicated generally by reference numeral 62 and 64, in series across the dc bus lines 52 and 54 act as an output filter and smooth the dc bus voltage. The capacitor value is selected based on desired ripple content in the dc bus voltage. The pair of diodes 44, 46 constrains power flow to be unidirectional from the input ac lines to the capacitors 62, 64. Thus, the circuit functions in the manner of a semi-controlled converter with active switches.

In the illustrated embodiment, the first set of gate controllable active switches 48, 50 is operable at a fixed duty cycle of about 50 percent. The switching frequency of the first set of gate controllable active switches S1 and S2 is selected so as to maintain a desired dc bus voltage. In addition, the switching frequency is selected such that the boost inductor current remains discontinuous and performance requirements, such as allowable total harmonic distortion and allowable input current ripple, are achieved. The switching frequency of the second set of gate controllable active switches 56, 58 is an integral multiple of the switching frequency of the first set of gate controllable active switches 48, 50. In one embodiment, the first and the second set of gate controllable active switches is switched via pulse width modulation. The second set of gate controllable active switches 56, 58 is operated at one or more duty cycle based on the output voltage requirement. It should be noted that in one embodiment the second set of gate controllable active switches 56, 58 is operated at one or more duty cycle for the desired out voltage requirement via a controller based on a feedback signal received from the electrical load 22. Further, it should be noted that the duty cycle is given by a ratio between an ON time and the total time of the gate controllable active switches, where the total time is sum of the ON time and the OFF time of the gate controllable active switches.

Further, in the illustrated embodiment, a sensor 66 coupled to the electrical load 22 senses one or more operating parameter of the electrical load 22. A controller 68 then compares the sensed operating parameters to the desired operating parameters or the set points 70 and generates a feedback signal. The controller 68 then regulates the operation of the second set of gate controllable active switches 56, 58 based on the feedback signal. It should be noted that in one implementation the controller 68 may also be adapted to regulate the switching of the first set of gate controllable active switches 48, 50. Alternatively, the switching of the first set of gate controllable active switches 48, 50 may be regulated via a separate controller.

The ac-ac power converter 12 of FIG. 2 with the plurality of switches open is depicted more clearly in FIG. 4. As illustrated in FIG. 4, the inverter circuit is a half bridge inverter circuit and includes the second set of gate controllable active switches 48, 50 and the pair of capacitors 62, 64. Additionally, the pair of dc bus diodes 32, 34 is introduced in the dc bus lines 52 and 54 so as to prevent the capacitors 62, 64 from discharging. It should be noted that, in the illustrated embodiment, the rectifier circuit and the half bridge inverter circuit are operated completely independent of each other, thereby providing greater freedom of operation. The boost inductor 26 is coupled to the ac-ac power converter 12 at nodes 42 for supplying discontinuous current, thereby providing discontinuous mode operation. The rectifier circuit includes the pair of diodes 44, 46 and the first set of gate controllable active switches 48, 50. The output of the half bridge inverter circuit is fed to the electrical load 22 via connection at nodes 40 and 60.

During the positive half cycle of the supply voltage, when switch 48 is turned ON, the energy in the boost inductor 26 rises from an initial zero value to some finite value governed by the ON time of the switch 48 and the value of inductance. During the OFF time of the switch 48, the energy stored in the boost inductor 26 is transferred via dc bus diode 32 to the pair of capacitors 62, 64. Similar operation results when switch 50 is made ON during negative half cycle of the supply voltage.

In the illustrated embodiment, the first set of gate controllable active switches 48, 50 is operable based on the desired dc voltage and/or total harmonic distortion. Further, the first set of gate controllable active switches 48, 50 is operated either at a fixed frequency and variable duty cycle, or at a variable frequency and a fixed duty cycle. As described above, the switching frequency of the first set of gate controllable active switches 48, 50 is selected so as to maintain a desired dc bus voltage and a discontinuous current in the boost inductor 26, while maintaining the performance requirements, such as allowable total harmonic distortion and allowable input current ripple, within specified limit.

Alternatively, in the illustrated embodiment, the boost inductor 26 may conduct a continuous current. In one embodiment, the first and the second set of gate controllable active switches are switched via pulse width modulation. The operation of the second set of gate controllable active switches 56, 58 is based on the output voltage requirement. In particular, as described above, the second set of gate controllable active switches 56, 58 is operated for the desired output voltage requirement via the controller 68 based on a feedback signal received from the electrical load 22. Thus, in the illustrated embodiment, the ac-ac power converter system 10 may be operated with greater freedom of operation and may be adapted to meet greater load requirements.

Figure 5:
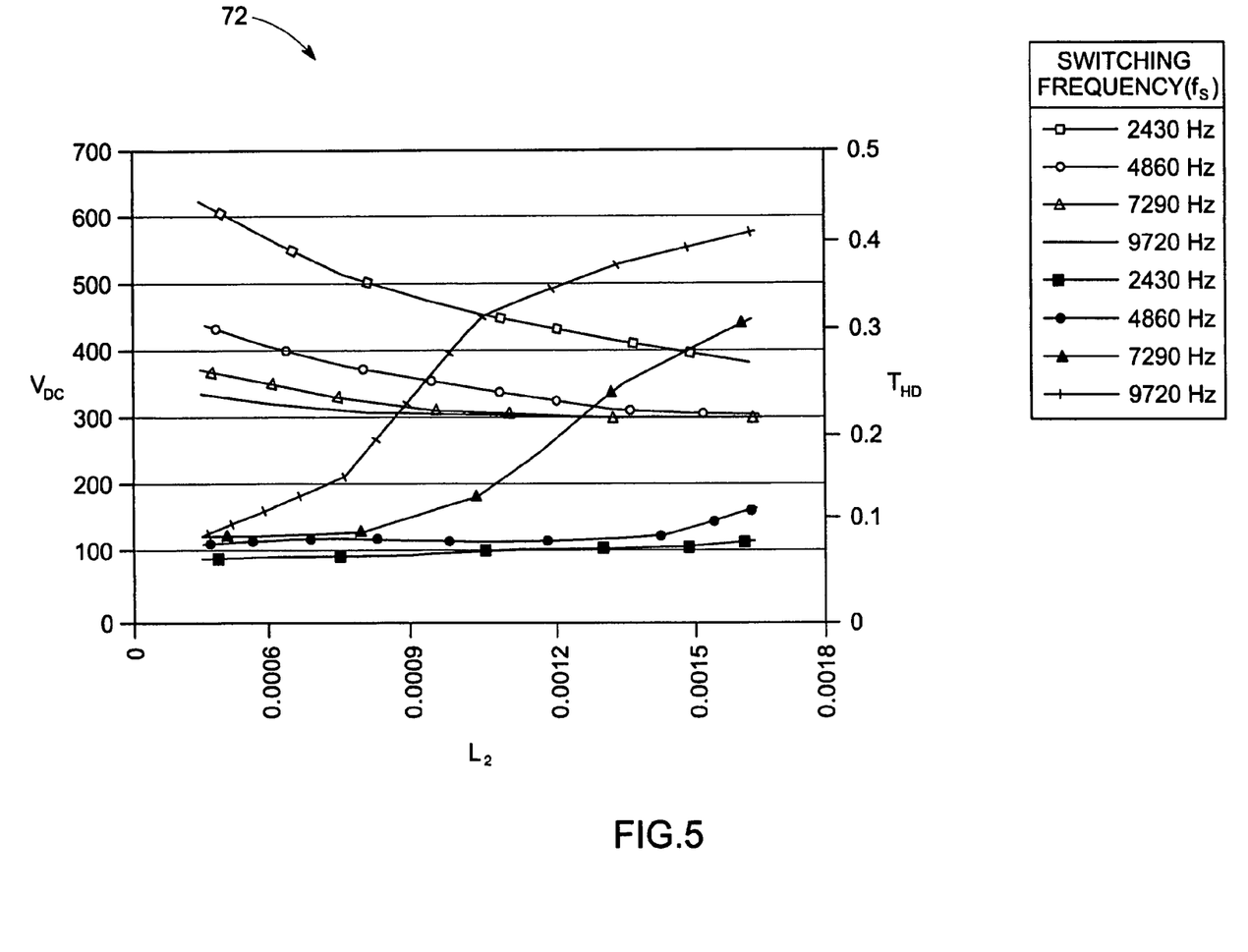
FIG. 5 is a graphical representation of a relation between dc bus voltage, switching frequency, inductance value of a boost inductor and total harmonic distortion at an input stage for a power converter system of the type illustrated in the previous figures.

FIG. 5 is a graphical representation of the relationship between dc bus voltage ($V_{DC}$), a plurality of switching frequencies ($f_S$) of the first set of gate controllable active switches and the inductance of the boost inductor ($L_2$) for discontinuous current conduction. In addition, the graph 72 also illustrates the relationship between total harmonic distortion ($T_{HD}$), a plurality of switching frequencies (fs) of the first set of gate controllable active switches and the inductance of the boost inductor ($L_2$) for discontinuous current conduction. As mentioned above, for a particular output voltage requirement, a desired dc bus voltage ($V_{DC}$) may be required. Further, for a desired dc bus voltage ($V_{DC}$) and a known inductance of the boost inductor 26, a particular switching frequency ($f_S$) is selected such that the boost inductor current is discontinuous and the total harmonic distortion ($T_{HD}$) is within the desired limits.

Figure 6:
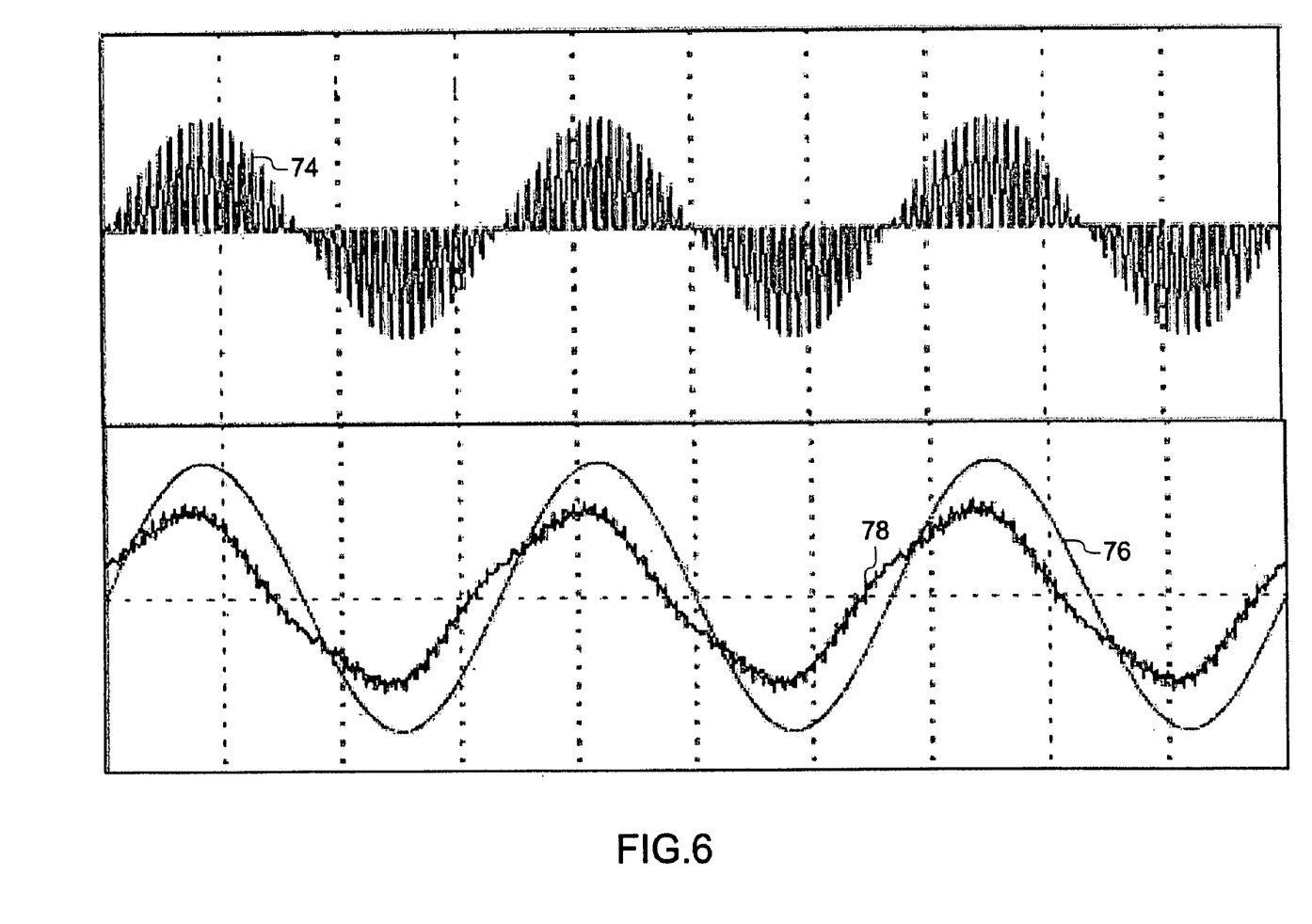
FIG. 6 is a graphical representation of a boost inductor current waveform along with input voltage and current waveforms in the ac-ac power converter system of FIG. 2.

FIG. 6 depicts boost inductor current waveform 74, input voltage waveform 76 and input current waveform 78. As illustrated, the boost inductor current is a discontinuous current and the input current is almost sinusoidal in accordance with the aspects of the present technique.

The operation of the ac-ac power converter system 10 may be regulated by the various techniques mentioned above so as to provide output voltage of desired amplitude and/or frequency that may be useful for a wide variety of applications. In particular, the ac-ac power converter system 10 may be used in a motor drive circuit for speed control of ac motors and brushless dc motors by supplying voltage of varying amplitude and/or frequency. The starting current consumed by the electrical machine is a function of load torque and combined moment of inertia of the machine. Hence, high inertia machines consume large amount of input current. To avoid large amounts of inrush current, the machine is generally started with reduced pulse width modulation frequency so as to provide the voltage of reduced magnitude to the machine. Once machine achieves a desired speed, such as about $\frac{2}{3}^{rd}$ of its rated speed, the normal pulse width modulation frequency is used to control the speed of the machine.

In one exemplary implementation, a position sensor senses motor rotor position that corresponds to the operational speed of the motor and sends a feedback signal to the controller. The controller then regulates the speed of the motor based on the feedback signal and the desired operating speed. The speed control is achieved by either varying the switching frequency and/or duty cycle of the first and the second set of gate controllable active switches in accordance with the control techniques mentioned above for the first and the second modes of operation.

For example, in the second mode of operation speed control is carried out by either varying the ON time of the first set of gate controllable active switches 48, 50 or by varying ON time of the second set of gate controllable active switches 56, 58. Alternatively, speed control of the motor may be achieved by varying the switching frequency of the second set of gate controllable active switches 56, 58. It should be noted that the ON time of the first set of gate controllable active switches 48, 50 defines the base speed of motor for a given dc bus voltage. Thus, the ac-ac power converter system 10 may be employed for starting, running and speed control of an electrical machine.

The ac-ac power converter system 10 as described in the various embodiments discussed above provides the benefit of high power factor, low total harmonic distortion, lower component count and operation at high frequencies. Additionally, the discontinuous current conduction in the boost inductor may be advantageous for better power factor of the ac-ac power converter system 10 and better efficiency of the semiconductor switches. All the benefits mentioned above and others may be achieved via simple control techniques described above. As would be appreciated by one skilled in the art, the ac-ac power converter system 10 is adapted to operate on wide range of supply voltage (e.g., 90V-260V) and frequencies (e.g., 50 Hz-60 Hz) without changing the component layout and rating.

Further, a wide range of speed variation and better current waveforms are achieved under the starting and running condition of motors with the motor drive circuit employing the ac-ac power converter system 10 as described in the various embodiments discussed above. In addition, the motor drive circuit is more reliable due to reduced number of components and simple control techniques. The ac-ac power converter system 10 as described in various embodiments discussed above may be used to drive any suitable ac loads and may therefore be used in a wide variety of applications such as lighting, heating, power conditioners, electrolytic capacitors and others. Further, as noted above, the present techniques may be adapted to supply power to three-phase electrical loads.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of controlling an ac-ac power converter system, the method comprising:
   applying a discontinuous current to an ac-ac power converter via a boost inductor;
   switching the ac-ac power converter between a first mode of operation and a second mode of operation, wherein the first mode of operation comprises operating a first set of gate controllable active switches via pulse width modulation at about 50 percent duty cycle and wherein the second mode of operation comprises operating the first set of gate controllable active switches via pulse width modulation based on at least one of a dc bus voltage requirement and a harmonic requirement at an input stage, the first set of gate controllable active switches being shared between a rectifier circuit and an inverter circuit in the first mode of operation; and
   operating a second set of gate controllable active switches via pulse width modulation based on an output voltage requirement.

2. The method of claim 1, wherein switching between the first mode of operation and the second mode of operation is based on an output voltage requirement.

3. The method of claim 1, wherein operating the second set of gate controllable active switches based on an output voltage requirement comprises operating the second set of gate controllable active switches based on a feedback signal received from an electrical load.

4. The method of claim 1, further comprising operating the first set of gate controllable active switches at a switching frequency based on the dc bus voltage requirement in the first mode of operation.

5. The method of claim 1, wherein a switching frequency of the second set of gate controllable active switches is an integral multiple of a switching frequency of the first set of gate controllable active switches in the first mode of operation.

6. The method of claim 1, wherein the second set of gate controllable active switches is operable at a variable duty cycle in the first mode of operation.

7. The method of claim 1, wherein the second set of gate controllable active switches form a half bridge inverter circuit in the second mode of operation.

8. The method of claim 1, wherein the first set of gate controllable active switches is operable at a fixed frequency and a variable duty cycle in the second mode of operation.

9. The method of claim 1, wherein the first set of gate controllable active switches is operable at a variable frequency and a fixed duty cycle in the second mode of operation.

10. A method of controlling an ac-ac power converter system, the method comprising:
    applying a discontinuous current to an ac-ac power converter via a boost inductor, the ac-ac power converter comprising a first and a second set of gate controllable active switches, the first set of gate controllable active switches beings shared between a rectifier circuit and an inverter circuit;
    operating the first set of gate controllable active switches via pulse width modulation at about 50 percent duty cycle; and
    operating the second set of gate controllable active switches via pulse width modulation based on an output voltage requirement.

11. The method of claim 10, wherein operating a second set of gate controllable active switches based on an output voltage requirement comprises operating the second set of gate controllable active switches based on a feedback signal received from an electrical load.

12. The method of claim 10, further comprising operating the first set of gate controllable active switches at a switching frequency based on the dc bus voltage requirement in the first mode of operation.

13. The method of claim 10, wherein a switching frequency of the second set of gate controllable active switches is an integral multiple of a switching frequency of the first set of gate controllable active switches.

14. The method of claim 10, wherein the second set of gate controllable active switches is operable at a variable duty cycle.

15. An ac-ac power convener system for supplying power to an electrical load, the ac-ac power converter system comprising:
    a boost inductor for applying a discontinuous current to an ac-ac power converter operable in two modes, wherein the ac-ac power converter operable in a first mode comprises:
      a rectifier circuit for convening an input ac power to a dc power, the rectifier circuit comprising of a first set of gate controllable active switches; and
      an inverter circuit for converting the dc power to an output ac power, the inverter circuit comprising of a second set of gate controllable active switches, wherein the first set of gate controllable active switches is common between the inverter circuit and the rectifier circuit and is operable at about 50 percent of duty cycle;
    and wherein the ac-ac power convener operable in a second mode comprises:
      a rectifier circuit for convening an input ac power to a dc power, the rectifier circuit comprising of the first set of gate controllable active switches; and
      a half bridge inverter circuit for convening the dc power to an output ac power, the half bridge inverter circuit comprising of the second set of gate controllable active switches; and
    a switch for switching between the two modes based on an output voltage requirement.

16. The ac-ac power converter system of claim 15, further comprising an ac filter coupled to an input ac power source for reducing harmonics.

17. The ac-ac power converter system of claim 15, further comprising one or more control circuitry for regulating switching of at least one of the first set and the second set of gate controllable active switches.

18. The ac-ac power converter system of claim 17, wherein the one or more control circuitry regulates switching of the gate controllable active switches via pulse width modulation.

19. An ac-ac power converter system for supplying power to an electrical load, the ac-ac power converter system comprising:
  a boost inductor for applying a discontinuous current to an ac-ac power converter, the ac-ac power converter comprising:
    a rectifier circuit for converting an input ac power to a dc power, the rectifier circuit comprising of a first set of gate controllable active switches; and
    an inverter circuit for converting the dc power to an output ac power, the inverter circuit comprising of a second set of gate controllable active switches; and
  a switch for switching between a first mode of operation and a second mode of operation, wherein in the first mode of operation the first set of gate controllable active switches is common between the inverter circuit and the rectifier circuit and is operable at about 50 percent of duty cycle and wherein in the second mode of operation the inverter circuit is a half bridge inverter circuit.

20. The ac-ac power converter system of claim 19, further comprising an ac filter coupled to an input ac power source for reducing harmonics.

21. The ac-ac power converter system of claim 19, further comprising one or more control circuitry for regulating switching of at least one of the first set and the second set of gate controllable active switches.

22. The ac-ac power converter system of claim 21, wherein the one or more control circuitry regulates switching of the gate controllable active switches via pulse width modulation.

23. An ac-ac power converter system for supplying power to an electrical load, the ac-ac power converter system comprising:
  a boost inductor for applying a discontinuous current to an ac-ac power converter, the ac-ac power converter comprising:
    a rectifier circuit for converting an input ac power to a dc power, the rectifier circuit comprising of a first set of gate controllable active switches; and
    an inverter circuit for converting the dc power to an output ac power, the inverter circuit comprising of a second set of gate controllable active switches, wherein the first set of gate controllable active switches is common between the inverter circuit and the rectifier circuit and is operable at about 50 percent of duty cycle.

24. The ac-ac power converter system of claim 23, further comprising an ac filter coupled to an input ac power source for reducing harmonics.

25. The ac-ac power converter system of claim 23, further comprising one or more control circuitry for regulating switching of at least one of the first set and the second set of gate controllable active switches.

26. The ac-ac power converter system of claim 25, wherein the one or more control circuitry regulates switching of the gate controllable active switches via pulse width modulation.

27. A system for driving a single phase electrical machine, the system comprising:
  an ac-ac power converter system coupled to the single phase electrical machine, the ac-ac power converter system comprising:
    a boost inductor for applying a discontinuous current to an ac-ac power converter, the ac-ac power converter comprising:
      a rectifier circuit for converting an input ac power to a dc power, the rectifier circuit comprising of a first set of gate controllable active switches; and
      an inverter circuit for converting the dc power to an output ac power, the inverter circuit comprising of a second set of gate controllable active switches; and
    a switch for switching between a first mode of operation and a second mode of operation, wherein in the first mode of operation the first set of gate controllable active switches is common between the inverter circuit and the rectifier circuit and is operable at about 50 percent of duty cycle and wherein in the second mode of operation the inverter circuit is a half bridge inverter circuit.

28. The system of claim 27, further comprising one or more control circuitry for regulating switching of at least one of the first set and the second set of gate controllable active switches.

29. The system of claim 28, wherein the one or more control circuitry regulates switching of the gate controllable active switches based on a feedback signal received from the single phase electrical machine.

30. A method for driving a single phase electrical machine, the method comprising:
  sensing an operating parameter of the electrical machine;
  comparing the operating parameter to a desired parameter and generating a feedback signal;
  regulating an output voltage of an ac-ac power converter system via at least one of a first mode of operation and a second mode of operation, wherein the first mode of operation comprises:
    applying a discontinuous current to an ac-ac power converter via a boost inductor, the ac-ac power converter comprising a first and a second set of gate controllable active switches;
    operating the first set of gate controllable active switches via pulse width modulation at about 50 percent duty cycle; and
    operating the second set of gate controllable active switches via pulse width modulation based on an output voltage requirement;
  and wherein the second mode of operation comprises:
    applying a discontinuous current to an ac-ac power converter via a boost inductor, the ac-ac power converter comprising a first and a second set of gate controllable active switches;
    operating a first set of gate controllable active switches via pulse width modulation based on at least one of a dc bus voltage and a harmonic requirement at an input stage; and
    operating a second set of gate controllable active switches via pulse width modulation based on an output voltage requirement, wherein the second set of gate controllable active switches form a half bridge inverter circuit.

* * * * *